(12) United States Patent
Ichimi

(10) Patent No.: US 10,325,572 B2
(45) Date of Patent: Jun. 18, 2019

(54) INFORMATION PROCESSING APPARATUS AND DISPLAY METHOD FOR SORTING AND DISPLAYING FONT PRIORITY

(71) Applicant: CANON KABUSHIKI KAISHA, Tokyo (JP)

(72) Inventor: Hideshi Ichimi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/869,401

(22) Filed: Sep. 29, 2015

(65) Prior Publication Data

US 2016/0092439 A1   Mar. 31, 2016

(30) Foreign Application Priority Data

Sep. 30, 2014  (JP) ................................. 2014-200869

(51) Int. Cl.
| | |
|---|---|
| *G06F 17/00* | (2019.01) |
| *G06F 17/21* | (2006.01) |
| *G06F 17/28* | (2006.01) |
| *G06F 3/048* | (2013.01) |
| *G09G 5/24* | (2006.01) |
| *G06F 9/451* | (2018.01) |
| *G06F 17/22* | (2006.01) |
| *G09G 5/16* | (2006.01) |

(52) U.S. Cl.
CPC ............... *G09G 5/24* (2013.01); *G06F 9/454* (2018.02); *G06F 17/214* (2013.01); *G06F 17/2223* (2013.01); *G09G 5/16* (2013.01)

(58) Field of Classification Search
CPC ............... G06F 17/214; G06F 17/2217; G06F 17/30132; G06F 17/3048
See application file for complete search history.

(56) References Cited

U.S. PATENT DOCUMENTS

| | | | |
|---|---|---|---|
| 6,677,965 B1 | 1/2004 | Ullmann | |
| 2008/0114587 A1* | 5/2008 | Scott | ..................... G06F 17/276 |
| | | | 704/3 |
| 2008/0303822 A1* | 12/2008 | Taylor | ................... G06F 17/214 |
| | | | 345/467 |

(Continued)

FOREIGN PATENT DOCUMENTS

| | | |
|---|---|---|
| CN | 1728806 A | 2/2006 |
| CN | 101567035 A | 10/2009 |

(Continued)

*Primary Examiner* — Ariel Mercado
(74) *Attorney, Agent, or Firm* — Canon U.S.A., Inc. IP Division

(57) ABSTRACT

Information processing apparatus includes a font data holding unit configured to hold font data of individual languages, a font priority list control unit configured to set a font priority list which represents a priority order of font data to be used for rendering a character string and which has the most preferential font data corresponding to a display language which is associated with user identification information input by an input unit and which is held by a user language holding unit and the second most preferential font data corresponding to a display language held by a device language holding unit, and a font rendering processing unit configured to render the character string in accordance with the font priority list set by the font priority list control unit and the font data held by the font data holding unit.

10 Claims, 11 Drawing Sheets

(56) References Cited

U.S. PATENT DOCUMENTS

| | | | |
|---|---|---|---|
| 2012/0033874 A1 | 2/2012 | Perronnin | |
| 2012/0079374 A1* | 3/2012 | Gaddis | G06F 17/30905 715/269 |
| 2012/0117587 A1* | 5/2012 | Pedlow | H04N 21/4122 725/25 |
| 2013/0033498 A1 | 2/2013 | Linnerud | |
| 2013/0326347 A1* | 12/2013 | Albright | G06F 9/454 715/265 |
| 2014/0035823 A1* | 2/2014 | Khoe | G06F 17/273 345/171 |
| 2014/0180671 A1* | 6/2014 | Osipova | G06F 17/275 704/8 |
| 2015/0074522 A1* | 3/2015 | Harned, III | G06F 17/214 715/269 |
| 2015/0097842 A1* | 4/2015 | Kaasila | G06F 17/214 345/471 |
| 2015/0363400 A1* | 12/2015 | Hernandez | G06F 17/214 707/736 |

FOREIGN PATENT DOCUMENTS

| | | |
|---|---|---|
| CN | 102523457 A | 6/2012 |
| CN | 103379243 A | 10/2013 |
| JP | 2010-160667 A | 7/2010 |
| JP | 2010204980 A | 9/2010 |
| TW | 454126 B | 9/2001 |

\* cited by examiner

FIG. 3

| DISPLAY LANGUAGE (802) | LANGUAGE TYPE (803) |
|---|---|
| JAPANESE | ShiftJIS |
| ENGLISH | WindowsCodePage 1252 |
| FRENCH | WindowsCodePage 1252 |
| GERMAN | WindowsCodePage 1252 |
| RUSSIAN | WindowsCodePage 1251 |
| CZECH | WindowsCodePage 1250 |
| GREEK | WindowsCodePage 1253 |
| TURKISH | WindowsCodePage 1254 |
| VIETNAMESE | WindowsCodePage 1258 |
| CHINESE | GB 18030 |
| FORMOSAN | Big5 |
| KOREAN | KSC 5601 |
| THAI | WindowsCodePage 874 |
| ARABIC | WindowsCodePage 1256 |
| HINDI | Hindi |

801

| LANGUAGE TYPE (902) | FONT PRIORITY LIST (903) |
|---|---|
| ShiftJIS | JAPANESE FONT PRIORITY LIST |
| WindowsCodePage 1250 | LATIN FONT PRIORITY LIST |
| WindowsCodePage 1251 | LATIN FONT PRIORITY LIST |
| WindowsCodePage 1252 | LATIN FONT PRIORITY LIST |
| WindowsCodePage 1253 | LATIN FONT PRIORITY LIST |
| WindowsCodePage 1254 | LATIN FONT PRIORITY LIST |
| WindowsCodePage 1256 | ARABIC FONT PRIORITY LIST |
| WindowsCodePage 1257 | LATIN FONT PRIORITY LIST |
| WindowsCodePage 1258 | LATIN FONT PRIORITY LIST |
| GB 18030 | CHINESE FONT PRIORITY LIST |
| Big5 | FORMOSAN FONT PRIORITY LIST |
| KSC 5601 | KOREAN FONT PRIORITY LIST |
| WindowsCodePage 874 | THAI FONT PRIORITY LIST |
| Hindi | HINDI FONT PRIORITY LIST |
| Unicode | BASED ON DISPLAY LANGUAGE |

901

| FONT PRIORITY LIST (1001) | FIRST PRIORITY (1002) | SECOND PRIORITY | THIRD PRIORITY | FOURTH PRIORITY | FIFTH PRIORITY | SIXTH PRIORITY | SEVENTH PRIORITY | EIGHTH PRIORITY |
|---|---|---|---|---|---|---|---|---|
| JAPANESE FONT PRIORITY LIST | JAPANESE | LATIN | CHINESE | FORMOSAN | KOREAN | THAI | ARABIC | HINDI |
| LATIN FONT PRIORITY LIST | LATIN | JAPANESE | CHINESE | FORMOSAN | KOREAN | THAI | ARABIC | HINDI |
| FORMOSAN FONT PRIORITY LIST | FORMOSAN | JAPANESE | CHINESE | LATIN | KOREAN | THAI | ARABIC | HINDI |
| CHINESE FONT PRIORITY LIST | CHINESE | JAPANESE | FORMOSAN | KOREAN | LATIN | THAI | ARABIC | HINDI |
| KOREAN FONT PRIORITY LIST | KOREAN | JAPANESE | CHINESE | FORMOSAN | LATIN | THAI | ARABIC | HINDI |
| THAI FONT PRIORITY LIST | THAI | LATIN | JAPANESE | CHINESE | FORMOSAN | KOREAN | ARABIC | HINDI |
| ARABIC FONT PRIORITY LIST | ARABIC | LATIN | JAPANESE | CHINESE | FORMOSAN | KOREAN | THAI | HINDI |
| HINDI FONT PRIORITY LIST | HINDI | LATIN | JAPANESE | CHINESE | FORMOSAN | KOREAN | THAI | ARABIC |

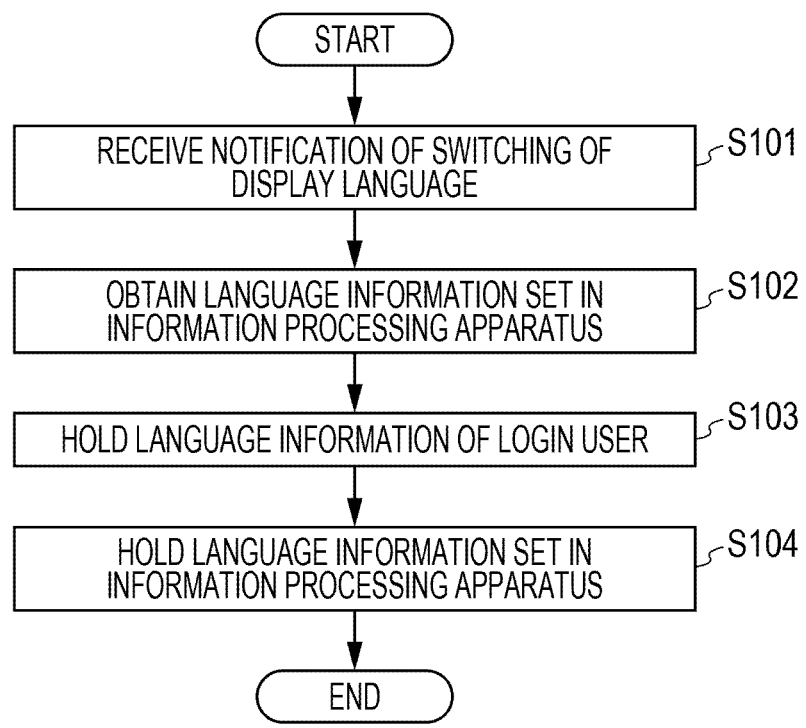

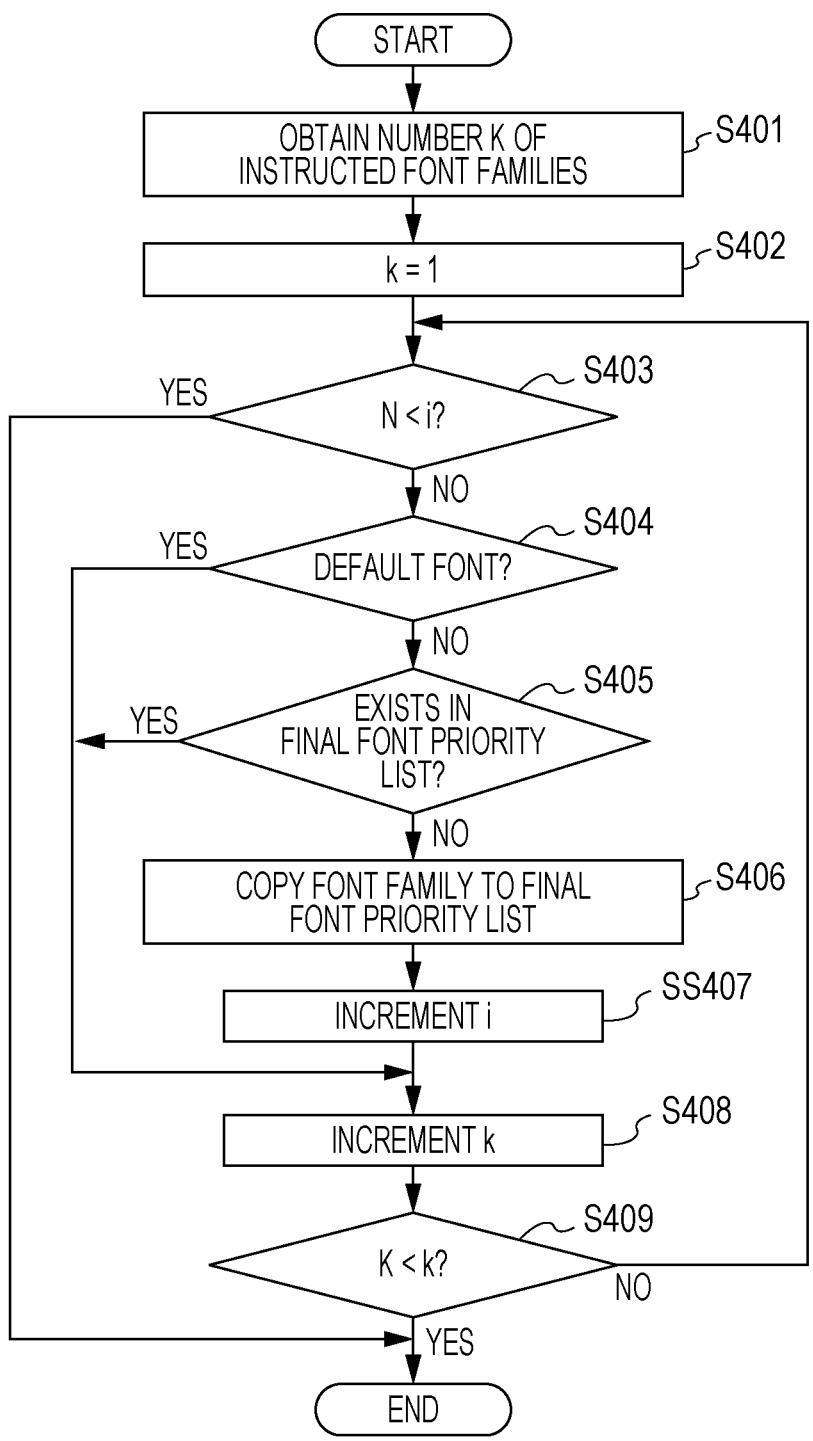

FIG. 8

| FONT PRIORITY LIST | FIRST PRIORITY | SECOND PRIORITY | THIRD PRIORITY | FOURTH PRIORITY | FIFTH PRIORITY | SIXTH PRIORITY | SEVENTH PRIORITY | EIGHTH PRIORITY |
|---|---|---|---|---|---|---|---|---|
| JAPANESE FONT PRIORITY LIST | JAPANESE | LATIN | CHINESE | FORMOSAN | KOREAN | THAI | ARABIC | HINDI |
| LATIN FONT PRIORITY LIST | LATIN | KOREAN | JAPANESE | CHINESE | FORMOSAN | THAI | ARABIC | HINDI |
| FORMOSAN FONT PRIORITY LIST | FORMOSAN | JAPANESE | CHINESE | LATIN | KOREAN | THAI | ARABIC | HINDI |
| CHINESE FONT PRIORITY LIST | CHINESE | JAPANESE | FORMOSAN | KOREAN | LATIN | THAI | ARABIC | HINDI |
| KOREAN FONT PRIORITY LIST | KOREAN | JAPANESE | CHINESE | FORMOSAN | LATIN | THAI | ARABIC | HINDI |
| THAI FONT PRIORITY LIST | THAI | LATIN | JAPANESE | CHINESE | FORMOSAN | KOREAN | ARABIC | HINDI |
| ARABIC FONT PRIORITY LIST | ARABIC | LATIN | JAPANESE | CHINESE | FORMOSAN | KOREAN | THAI | HINDI |
| HINDI FONT PRIORITY LIST | HINDI | LATIN | JAPANESE | CHINESE | FORMOSAN | KOREAN | THAI | ARABIC |

INFORMATION PROCESSING APPARATUS AND DISPLAY METHOD FOR SORTING AND DISPLAYING FONT PRIORITY

BACKGROUND OF THE INVENTION

Field of the Invention

The present invention relates to an information processing apparatus including fonts of a plurality of languages so as to realize multi-language display, a display method, and a storage medium.

Description of the Related Art

Image processing apparatuses which have an authentication function and which are capable of performing multi-language display automatically perform switching of a display language so as to display a language based on information on a registered user (hereinafter referred to as "user information) when the user logs in. Japanese Patent Laid-Open No. 2010-160667 discloses an information processing apparatus capable of performing such multi-language display. Since the display language is automatically switched when a login is performed, the user is not required to manually switch the display language. Therefore, usability of the information processing apparatuses is improved.

Information processing apparatuses including a display apparatus, such as image forming apparatuses including printers and smartphones, are capable of switching a display language at an arbitrary timing by a user's operation. Furthermore, such an information processing apparatus is capable of simultaneously displaying a plurality of languages, such as English, Japanese, and Chinese, on a display screen. To simultaneously display a plurality of languages, the information processing apparatus has a character encoding scheme which is referred to as "Unicode" in which character codes of various languages are integrated.

The information processing apparatus is capable of not only constructing the character encoding scheme by Unicode but also holding font data of individual languages and performing display preferentially using font data corresponding to a display language so as to perform switching of the display language. Furthermore, the information processing apparatus may provide a font priority list which stores a priority order of languages to be used, for example, so as to switch the display language in accordance with the priority order of the font priority list. A plurality of font priority lists having different priority orders of languages are included in the information processing apparatus, and are switched from one to another in accordance with the display language. Furthermore, the font priority lists may be set in order of history while a language being displayed has a highest priority. By combining these techniques, the display language may be automatically switched to a language based on user information of a login user and multi-language display may be realized.

In Unicode, kanji characters used in Japanese, Chinese, Korean, Formosan, and Vietnamese are referred to as "Chinese-Japanese-Korean-Vietnamese (CJKV) unified ideographs". In the CJKV unified ideographs, similar characters are mapped in the same character code. The CJKV unified ideographs have font data of the individual languages. The information processing apparatus may display an optimum font by selecting font data preferentially used in accordance with a display language from among the plurality of font data included in the CJKV unified ideographs.

In a case where a display language is switched in accordance with user information of a login user, a priority order after a second preferential language may be different from that expected by the user when a general method for determining a priority order of languages is employed. In a case where an information processing apparatus in which Korean is set is used by a plurality of user, for example, even when user information on a login user indicates English, it is highly likely that file names, folder names, addresses, and the like displayed on a screen are registered in Korean. In a case where a priority order after a second preferential language is fixed or determined in order of history, a priority level of Japanese is high next to English, and therefore, character strings may be displayed by a Japanese font instead of Korean font. In this case, the information processing apparatus may not perform appropriate character display since the character strings of the file names, the folder names, the addresses, and the like registered in Korean are displayed by the Japanese font.

The present invention provides an information processing apparatus capable of performing appropriate character display.

SUMMARY OF THE INVENTION

According to an embodiment of the present invention, there is provided an information processing apparatus including an input unit configured to accept input by a user, a display unit configured to display an image including a character string, a user language holding unit configured to hold a display language associated with user identification information, a device language holding unit configured to hold a display language set in the information processing apparatus by default, a font data holding unit configured to hold font data of individual languages, a font priority list control unit configured to set a font priority list which represents a priority order of font data to be used for rendering the character string and which has the most preferential font data corresponding to the display language which is associated with the user identification information input by the input unit and which is held by the user language holding unit and the second most preferential font data corresponding to the display language held by the device language holding unit, and a font rendering processing unit configured to render the character string in accordance with the font priority list set by the font priority list control unit and the font data held by the font data holding unit.

Further features of the present invention will become apparent from the following description of exemplary embodiments with reference to the attached drawings.

BRIEF DESCRIPTION OF THE DRAWINGS

FIG. 3 includes tables.

FIG. 4 is a flowchart illustrating a display language switching process.

FIG. 7 is a flowchart illustrating a process of reflecting a font family in a final font priority list.

FIG. 8 is a table of font priority lists.

DESCRIPTION OF THE EMBODIMENTS

Hereinafter an embodiment of the present invention will be described in detail with reference to the accompanying drawings.

Configuration

Figure 1:
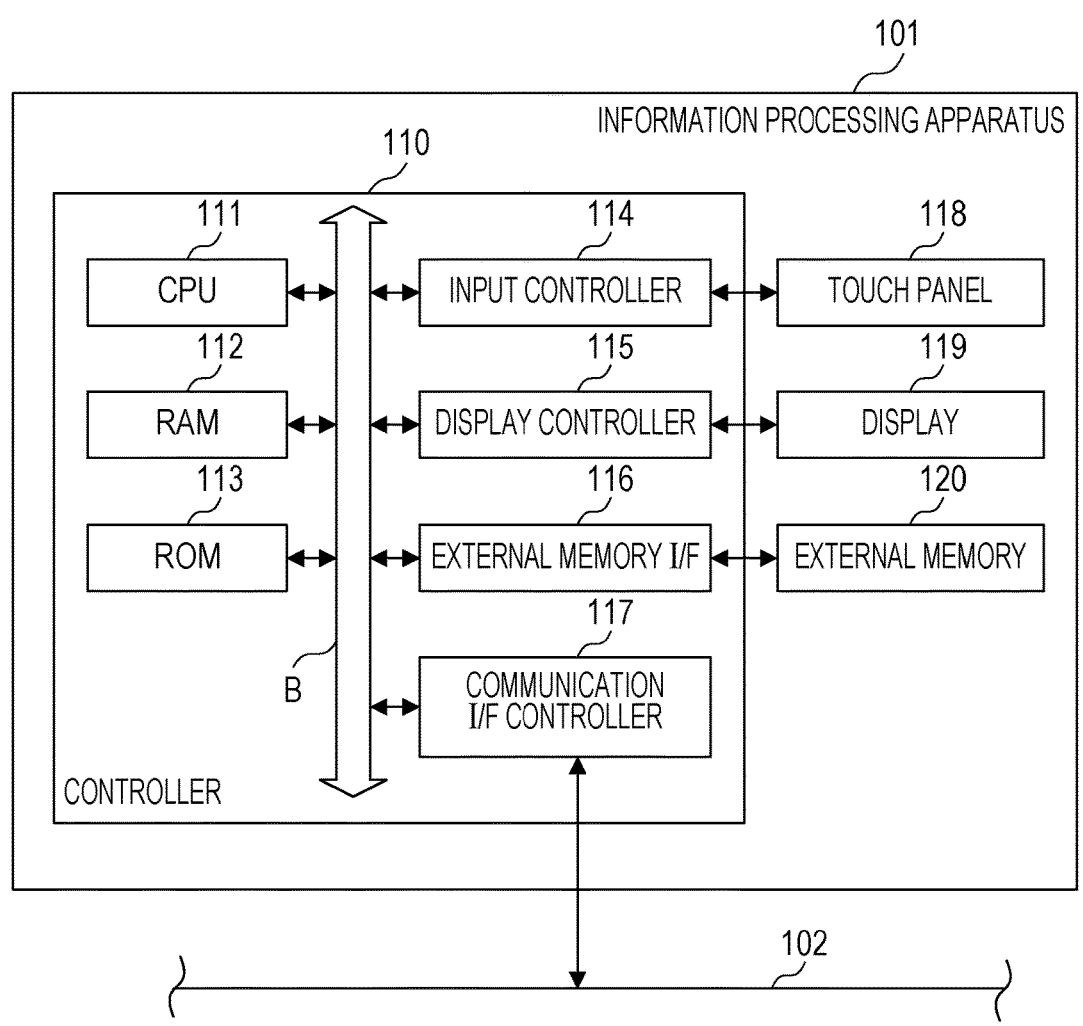
FIG. 1 is a diagram illustrating a hardware configuration of an information processing apparatus.

FIG. 1 is a diagram illustrating a hardware configuration of an information processing apparatus of this embodiment. An information processing apparatus 101 includes, as with an information forming apparatus and a smartphone, a display 119 (a display device). The information processing apparatus 101 has a user authentication function and performs character display using a language based on user information used at a time of authentication of a user (at a time of login) as a display language. The information processing apparatus 101 further includes, in addition to the display 119, a controller 110, a touch panel 118, and an external memory 120. The controller 110 controls entire operation of the information processing apparatus 101 using a central processing unit (CPU) 111, a random access memory (RAM) 112, and a read only memory (ROM) 113. Therefore, the controller 110 includes an input controller 114 connected to the touch panel 118, a display controller 115 connected to the display 119, and an external memory interface (I/F) 116 connected to the external memory 120. The controller 110 further includes a communication I/F controller 117 which performs control of communication with a network 102, such as a local area network (LAN). The CPU 111, the RAM 112, the ROM 113, the input controller 114, the display controller 115, the external memory I/F 116, and the communication I/F controller 117 are connected to one another through a system bus B so as to communicate with one another.

The CPU 111 reads a computer program stored in the ROM 113 and executes the computer program using the RAM 112 as a work area so as to control operations of the units included in the information processing apparatus 101. The ROM 113 which is a nonvolatile memory holds various data required for processes in addition to the computer program. The RAM 112 which is a volatile memory serves as a temporarily storage area used when the processes are performed.

The input controller 114 accepts a user's operation performed using an input device and transmits a control signal corresponding to the accepted operation to the CPU 111. In FIG. 1, the touch panel 118 is used as the input device. The touch panel 118 is a pointing device which detects a position touched by a user's finger, a stylus pen, or the like. The touch panel 118 may employ various systems including a resistance film system, an electrostatic capacitance system, a surface acoustic wave system, an infrared system, an electromagnetic induction system, an image recognition system, and an optical sensor system. As the input device, in addition to the touch panel 118, a character input device, such as a keyboard, or a pointing device, such as a mouse, may be used. The input controller 114 transmits a control signal associated with a position detected by the touch panel 118 to the CPU 111. The CPU 111 executes a process in accordance with the control signal. By this, the CPU 111 performs a process in accordance with a user's operation performed on the information processing apparatus 101.

The display controller 115 displays an image in the display 119 under control of the CPU 111. The display controller 115 displays an image of an object associated with a process in the display 119, for example. Furthermore, the display controller 115 displays an execution screen of application software (hereinafter referred to as "AP"). The image includes characters rendered by a predetermined language font.

The touch panel 118 is integrally disposed on a display screen of the display 119. The touch panel 118 has a transmittance which does not disturb display by the display 119. The CPU 111 specifies an object operated (touched) by the user in accordance with a position of the object displayed in the display 119 and a touched position detected by the touch panel 118 and executes a process associated with the object. In this way, a graphical user interface (GUI) which is an image displayed in the display 119 and directly operated by the user for input may be configured by the touch panel 118 and the display 119.

The external memory 120, such as a hard disk, a flexible disk, a compact disk (CD), a digital versatile disc (DVD), and a memory card, may be attached to the external memory I/F 116 which is a storage medium. The external memory I/F 116 performs reading of data from the attached external memory 120 and writing of data to the external memory 120 under control of the CPU 111. The communication I/F controller 117 controls communication with another apparatus connected to the network 102 through the network 102.

Figure 2:
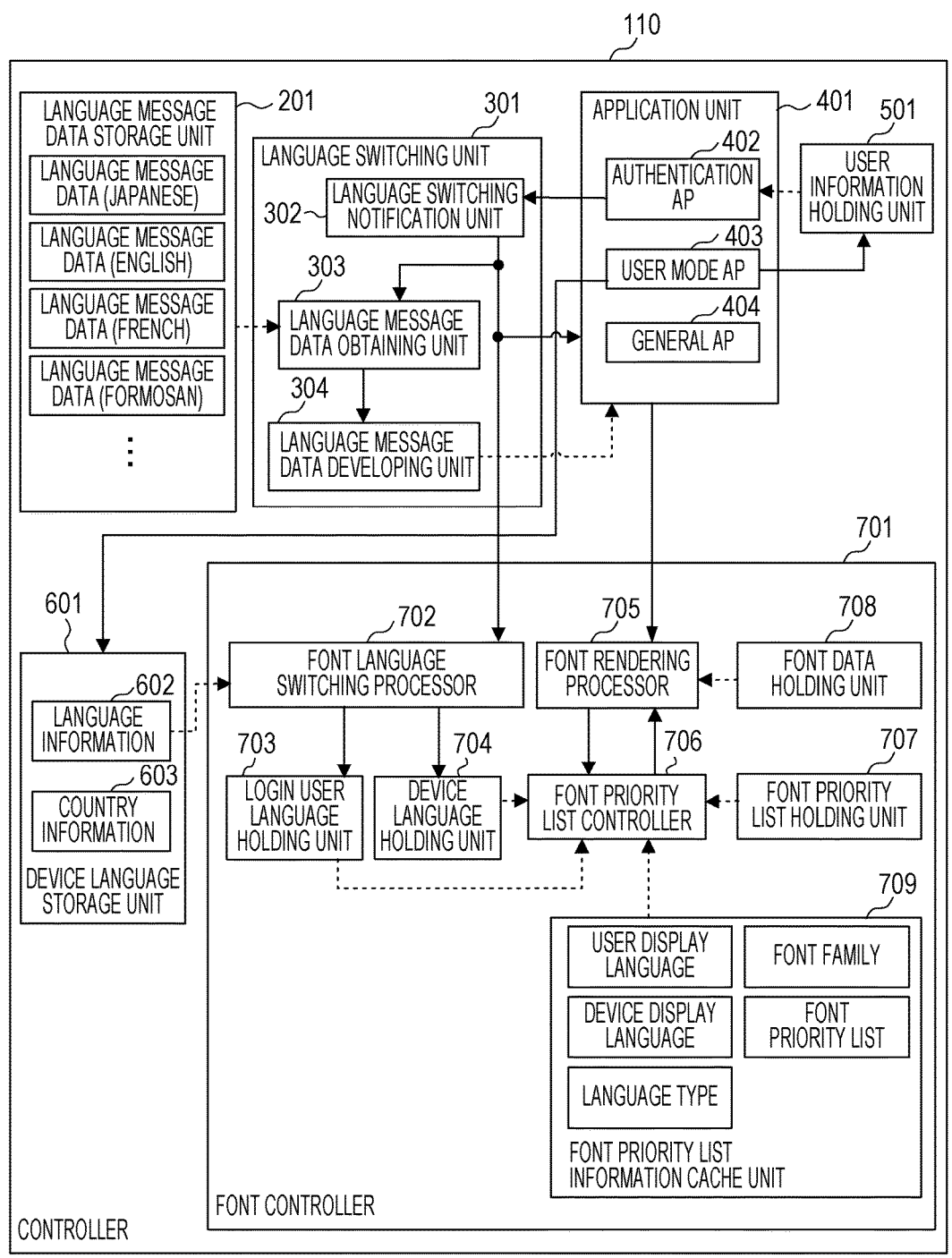
FIG. 2 is a functional block diagram illustrating functions for display language control.

FIG. 2 is a functional block diagram illustrating functions for control of a display language realized by the controller 110 of the information processing apparatus 101. Although the functions are realized when the CPU 111 executes the computer program read from the ROM 113, the functions may be configured as hardware. The information processing apparatus 101 includes a language message data storage unit 201, a language switching unit 301, an application unit 401, a user information holding unit 501, a device language storage unit 601, and a font controller 701. Note that dotted arrows in FIG. 2 denote data reference and solid arrows denote processing instructions and data storage.

The language message data storage unit 201 which is included in the ROM 113 or the external memory 120 stores language message data representing a message (a character string) to be displayed in the execution screen of the AP. The language message data storage unit 201 stores language message data of individual languages. In the example of FIG. 2, the language message data storage unit 201 stores language message data of various languages, such as Japanese, English, French, and Formosan.

The language switching unit 301 transmits a notification representing switching of a display language to the application unit 401 and the font controller 701 in response to an instruction for switching a display language, and obtains language message data of a specified language to be held from the language message data storage unit 201. Therefore, the language switching unit 301 includes a language switching notification unit 302, a language message data obtaining unit 303, and a language message data developing unit 304.

The language switching notification unit 302 receives an instruction for switching a display language from the application unit 401, for example, and transmits a notification representing the switching of a display language to the language message data obtaining unit 303, the application unit 401, and the font controller 701. The instruction for switching a display language is transmitted by an authentication process performed when a user logs in and includes language information included in user information of the authenticated user. The notification representing the switching of a display language includes language information included in the switching instruction. The display language is changed to a language represented by the language information.

The language message data obtaining unit 303 receives the switching notification supplied from the language switching notification unit 302. The language message data obtaining unit 303 obtains language message data corresponding to the language information included in the received switching notification from the language message data storage unit 201 and develops the obtained language message data in the language message data developing unit 304 in a form acceptable by the application unit 401. The language message data developing unit 304 included in the RAM 112 holds the language message data developed by the language message data obtaining unit 303.

The application unit 401 includes an authentication application (an authentication AP) 402, a user mode application (a user mode AP) 403, and a general application (a general AP) 404. The application unit 401 reads an application program from the external memory 120 or the like and executes the application program.

The authentication AP 402 is used to perform an authentication process at a time when the user logs in. The authentication AP 402 obtains information (a user ID, a password, and the like) required for the authentication from the touch panel 118 at the time of the login of the user and performs an authentication process by comparing the obtained information with user information held by the user information holding unit 501. The user information holding unit 501 is included in the ROM 113, the external memory 120, or an external apparatus, such as a server, connected through the network 102 and holds the user information. The user information includes a user ID of a user registered in the information processing apparatus 101, a password, language information representing a language used by the user, information on an available AP, and the like. The authentication AP 402 transmits to the language switching notification unit 302 an instruction for switching a display language including the language information included in the user information compared in the authentication process.

The user mode AP 403 performs a setting of the information processing apparatus 101 and a registration of a user. When user information is to be registered in the user information holding unit 501, the user mode AP 403 accepts an input of the user information from the touch panel 118 and stores the user information in the user information holding unit 501. In this way, a registration of a user in the information processing apparatus 101 is performed. The user mode AP 403 performs a setting of a default display language. When the default display language is set in the information processing apparatus 101, the user mode AP 403 transmits language information representing the set language to the device language storage unit 601.

The general AP 404 realizes functions provided by the information processing apparatus 101. If the information processing apparatus 101 is a multifunction peripheral, the general AP 404 realizes a copy function, a function of transmitting a scanned image, a function of storing the scanned image, and the like. The general AP 404 is provided for each function.

The application unit 401 causes the general AP 404 to display an image in the display 119 through the display controller 115. Furthermore, the application unit 401 instructs the font controller 701 to render a character string in accordance with the language information included in the switching notification of the display language supplied from the language switching notification unit 302. Therefore, the application unit 401 obtains the language message data developed in the language message data developing unit 304. The application unit 401 generates a character string to be rendered in accordance with the obtained language message data and transmits an instruction for rendering the character string including information on the generated character string to be rendered and the like to the font controller 701.

The device language storage unit 601 included in the RAM 112 or the external memory 120 stores language information 602 representing the display language set in the information processing apparatus 101 by default and country information 603 representing a country where the information processing apparatus 101 is installed. The language information 602 normally represents a language used in the country represented by the country information 603. The language information 602 is set by the user mode AP 403. The country information 603 is set by a service staff using the user mode AP 403 in accordance with a region and a country where the information processing apparatus 101 is installed when the information processing apparatus 101 is installed. The country information 603 may be changed when an installation location or the like of the information processing apparatus 101 is changed.

The font controller 701 includes a font language switching processor 702, a login user language holding unit 703, and a device language holding unit 704. The font controller 701 further includes a font rendering processor 705 for rendering a font, a font priority list controller 706, a font priority list holding unit 707, and a font data holding unit 708. The font controller 701 further includes a font priority list information cache unit 709.

The font language switching processor 702 receives the display language switching notification from the language switching notification unit 302 and holds the language information included in the received switching notification in the login user language holding unit 703. The font language switching processor 702 obtains the language information 602 from the device language storage unit 601 to be held in the device language holding unit 704. By this, the login user language holding unit 703 holds the language information representing a language to be used after switching, and the device language holding unit 704 holds the language information 602 representing the language set in the information processing apparatus 101. The login user language holding unit 703 and the device language holding unit 704 are included in the RAM 112.

The font rendering processor 705 receives the instruction for rendering a character string from the application unit 401 and instructs the font priority list controller 706 to generate a font priority list. The font priority list represents a priority order of languages used in the rendering of a character string. The instruction for rendering a character string includes, in addition to the character string to be rendered, information on a font family representing a font type, information on a language type, and the like. The font rendering processor 705 performs rendering of a character string using a font based on the instruction for rendering a character string in accordance with the generated font priority list and the font data held by font data holding unit 708. The font data holding unit 708 holds font data of various languages used by the font rendering processor 705 for rendering. The font data holding unit 708 is included in the ROM 113, the external memory 120, or the RAM 112.

Note that, in general, examples of the font family include "Arial" and "MS gothic". In this embodiment, font data of individual languages, such as a "Japanese font" and a "Latin font" represented in a priority order of a priority list 1003 of FIG. 3 described below, corresponds to the font family. Furthermore, the font family set in advance in the information processing apparatus 101 is referred to as a "default font family". When the font family is clearly specified, a font corresponding to the font family is most preferentially used.

The font priority list controller 706 receives an instruction for generating a font priority list from the font rendering processor 705 and generates a font priority list. The font priority list controller 706 obtains the language information of the login user language holding unit 703, the language information of the device language holding unit 704, and information on the font priority list holding unit 707 so as to generate the font priority list. The user language information obtained from the login user language holding unit 703 is referred to as a "user display language", and the language information set in the information processing apparatus 101 which is obtained from the device language holding unit 704 is referred to as a "device display language". The font priority list holding unit 707 holds font priority lists set in advance by default (hereinafter referred to as "default font priority lists"). The font priority list holding unit 707 holds a plurality of default font priority lists having different priority orders of font data of individual languages. The font priority list holding unit 707 is included in the ROM 113, the external memory 120, or the RAM 112.

The font priority list controller 706 obtains a default font priority list in which the font data of the language corresponding to the user display language is set as a most preferential language from the font priority list holding unit 707. The font priority list controller 706 determines whether font data set as a second preferential language in the obtained default font priority list is font data of a language corresponding to the device display language. When the determination is affirmative, the font priority list controller 706 determines the default font priority list as a final font list. The font priority list controller 706 transmits the final font priority list to the font rendering processor 705. When the determination is negative, the font priority list controller 706 changes a priority order of languages in the default font priority list. The font priority list controller 706 determines a new font priority list generated by changing the priority order as the final font priority list to be transmitted to the font rendering processor 705.

The font priority list information cache unit 709 is a region which stores the final font priority list generated by the font priority list controller 706 and is included in the RAM 112. The font priority list information cache unit 709 stores the final font priority list as a "font priority list". Furthermore, the font priority list information cache unit 709 stores the user display language, the device display language, the language type, and the font family (a priority list 1003) obtained when the final font priority list is generated.

Operation Form

FIG. 3 includes a table of display languages, a table of language types, and a table of font priority lists. The tables are held by the font priority list holding unit 707.

A display language table 801 represents the relationships between display languages 802 and language types 803. The display languages 802 represent languages which may be displayed by the information processing apparatus 101 in the display 119. The language types 803 represent character code sets and represent general character code sets, such as "ShiftJIS" for Japanese, "Windows Code Page 1252" for English, and "Big5" for Formosan. Hindi does not have a unique character code set, and therefore, a unique character code set of "Hindi" is conveniently defined. Although only some languages are included in the display languages 802 of the display language table 801, other languages are included in the display language table 801 in practice. Specifically, the display language table 801 represents a list of associations between the display languages 802 and the character code sets.

A language type table 901 includes language types 902 which link to the language types 803 of the display language table 801 and font priority lists 903 corresponding to the language types 902. The font priority lists 903 link to font priority lists 1002 of a font priority list table 1001.

The font priority list table 1001 includes the font priority lists 1002 which link to the font priority lists 903 of the language type table 901 and priority lists 1003 representing priority orders of font data of individual languages which are referred to when a character string is rendered. Although the priority lists 1003 of FIG. 3 only include the first priority to the eighth priority, the present invention is not limited to this. Furthermore, at least one font data is described in the first to eighth priorities as a font. The font priority list table 1001 includes the default font priority lists.

The font priority list controller 706 may determine the priority list 1003 based on the display languages 802 by sequentially referring to the display language table 801, the language type table 901, and the font priority list table 1001 in this order. For example, the font priority list controller 706 specifies one of the display languages 802 in accordance with a language represented by language information held by the login user language holding unit 703 and determines one of the font priority lists 1002 corresponding to the specified display language 802 as a default font priority list. In general, a language type instructed by the application unit 401 is Unicode, and in this case, the font priority list controller 706 determines one of the language types 902 after selecting one of the display languages 802, and thereafter, determines one of the priority lists 1003. When a character setting is specified in content in a case of a web page, for example, another language type (ShiftJIS, for example) may be specified. In this case, the font priority list controller 706 directly determines a priority list in accordance with the specified language type.

FIG. 4 is a flowchart illustrating a display language switching process. The process in the flowchart of FIG. 4 is executed when the font language switching processor 702 of the font controller 701 receives a notification of switching of a display language from the language switching notification unit 302 of the language switching unit 301.

The font language switching processor 702 receives a notification of switching of a display language including language information based on user information of a login user from the language switching notification unit 302 (S101). The font language switching processor 702 obtains the language information 602 representing the display language set in the information processing apparatus 101 from the device language storage unit 601 when receiving the switching notification (S102). The font language switching processor 702 holds the language information included in the switching notification supplied from the language switching notification unit 302 in the login user language holding unit 703 (S103). The font language switching processor 702 causes the device language holding unit 704 to hold the language information 602 obtained from the device language storage unit 601 (S104).

In this way, the font language switching processor 702 stores the language information based on the user information of the authenticated user in the login user language holding unit 703 when receiving the notification of switching of the display language from the language switching notification unit 302. Furthermore, the font language switching processor 702 stores the language information 602 set in the information processing apparatus 101 in the device language storage unit 601.

Figure 5:
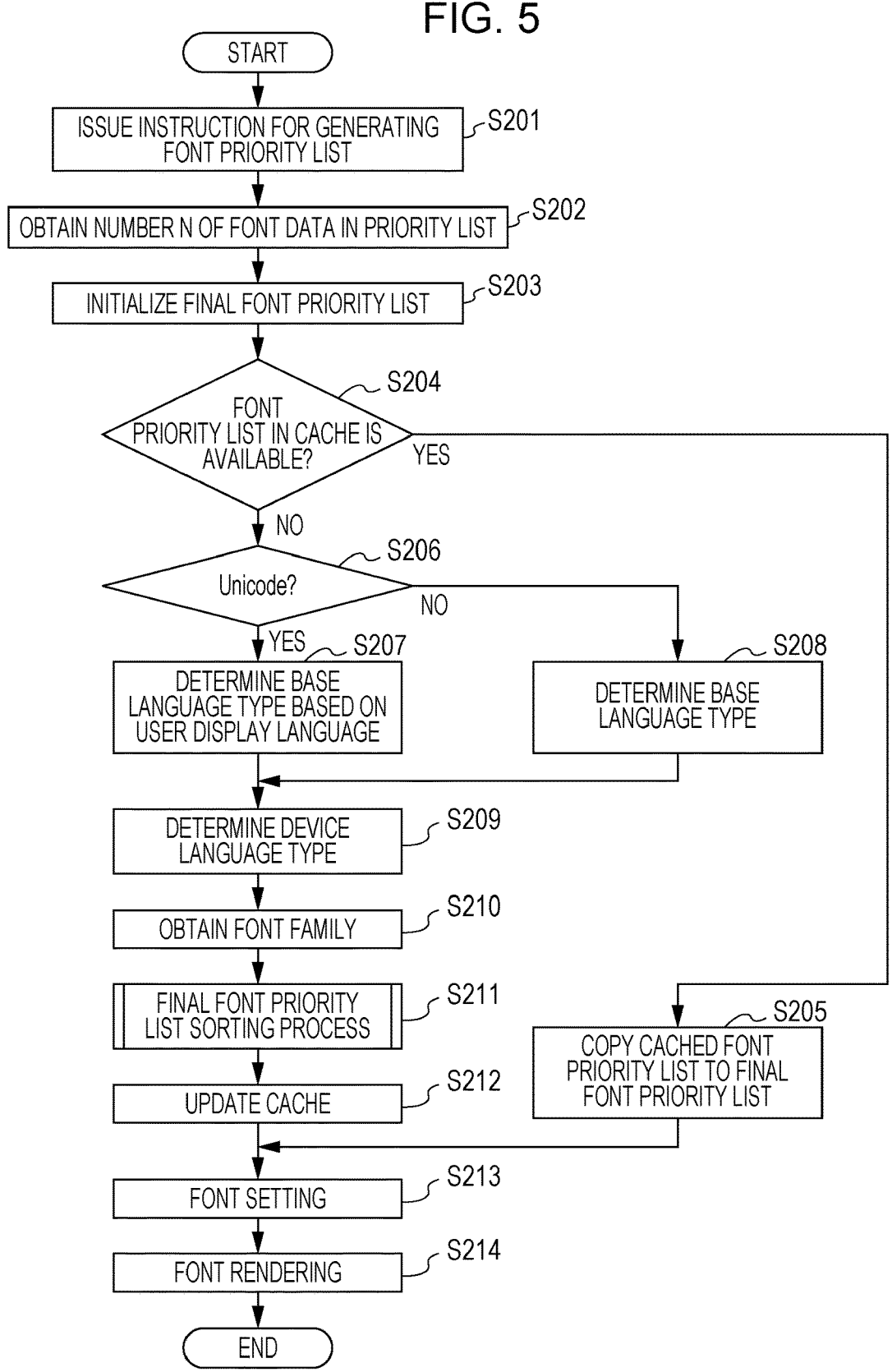
FIG. 5 is a flowchart illustrating a rendering process.

FIG. 5 is a flowchart illustrating a process of rendering a character string. The process in the flowchart of FIG. 5 is executed when the font rendering processor 705 of the font controller 701 receives an instruction for rendering a character string from the application unit 401.

The font rendering processor 705 instructs the font priority list controller 706 to generate a font priority list when receiving an instruction for rendering a character string from the application unit 401 (S201). The font priority list controller 706 which receives the instruction for generating a font priority list obtains the number N of font data included in the priority list 1003 of the font priority list table 1001 from the font priority list holding unit 707 (S202). In this embodiment, the number N is 8 (first to eighth priorities). However, the number N is dynamically changed in accordance with the number of font data which is listed up. The font priority list controller 706 initializes the final font priority list to be finally used using the obtained number N of font data (S203).

The font priority list controller 706 determines whether the font priority list which is stored (cached) in the font priority list information cache unit 709 is available (S204). The font priority list controller 706 obtains a user display language and a device display language for this determination. The font priority list controller 706 determines whether the obtained user display language and the obtained device display language match a user display language and a device display language stored in the font priority list information cache unit 709, respectively. Furthermore, the font priority list controller 706 determines whether a language type and a font family instructed by the application unit 401 correspond to a font priority list stored in the font priority list information cache unit 709. As a result of the determination, the font priority list controller 706 determines whether the font priority list stored in the font priority list information cache unit 709 is available. When the cached font priority list is available (Yes in step S204), the font priority list controller 706 copies the entire cached font priority list to the final font priority list (S205).

When the cached font priority list is not available (No in step S204), the font priority list controller 706 determines whether the language type instructed by the application unit 401 is Unicode (S206). When the language type is Unicode (Yes in step S206), the font priority list controller 706 determines a language type corresponding to the user display language as a base language type with reference to the display language table 801 (S207). When the language type is not Unicode (No in step S206), the font priority list controller 706 determines the language type instructed by the application unit 401 as the base language type (S208).

After the base language type is determined, the font priority list controller 706 determines a language type (a device language type) using the device display language held in the device language holding unit 704 with reference to the display language table 801 (S209). After the device language type is determined, the font priority list controller 706 obtains a font family in accordance with an instruction issued by the application unit 401 (S210). The font priority list controller 706 performs a process of sorting font data in the final font priority list (S211). The process of sorting the font data in the final font priority list will be described in detail hereinafter.

After the process of sorting the font data in the final font priority list, the font priority list controller 706 updates the information cached in the font priority list information cache unit 709 (S212). Examples of items of the information to be updated include the user display language, the device display language, the application language type, the font family, and the final font priority list.

The font rendering processor 705 sets a defined font data in the generated final font priority list (S213). At least one font data is set, and a plurality of font data, such as a double-byte character font and a single-byte character font for Japanese and Arabic and Roman characters for Arabic, may be set. The font rendering processor 705 performs a setting such that font data does not overlap with each other. The font rendering processor 705 sequentially searches for a set font data of each of characters in a character string instructed by the application unit 401 and performs rendering using font data of a corresponding code. In this way, the process is terminated (S214).

Figure 6:
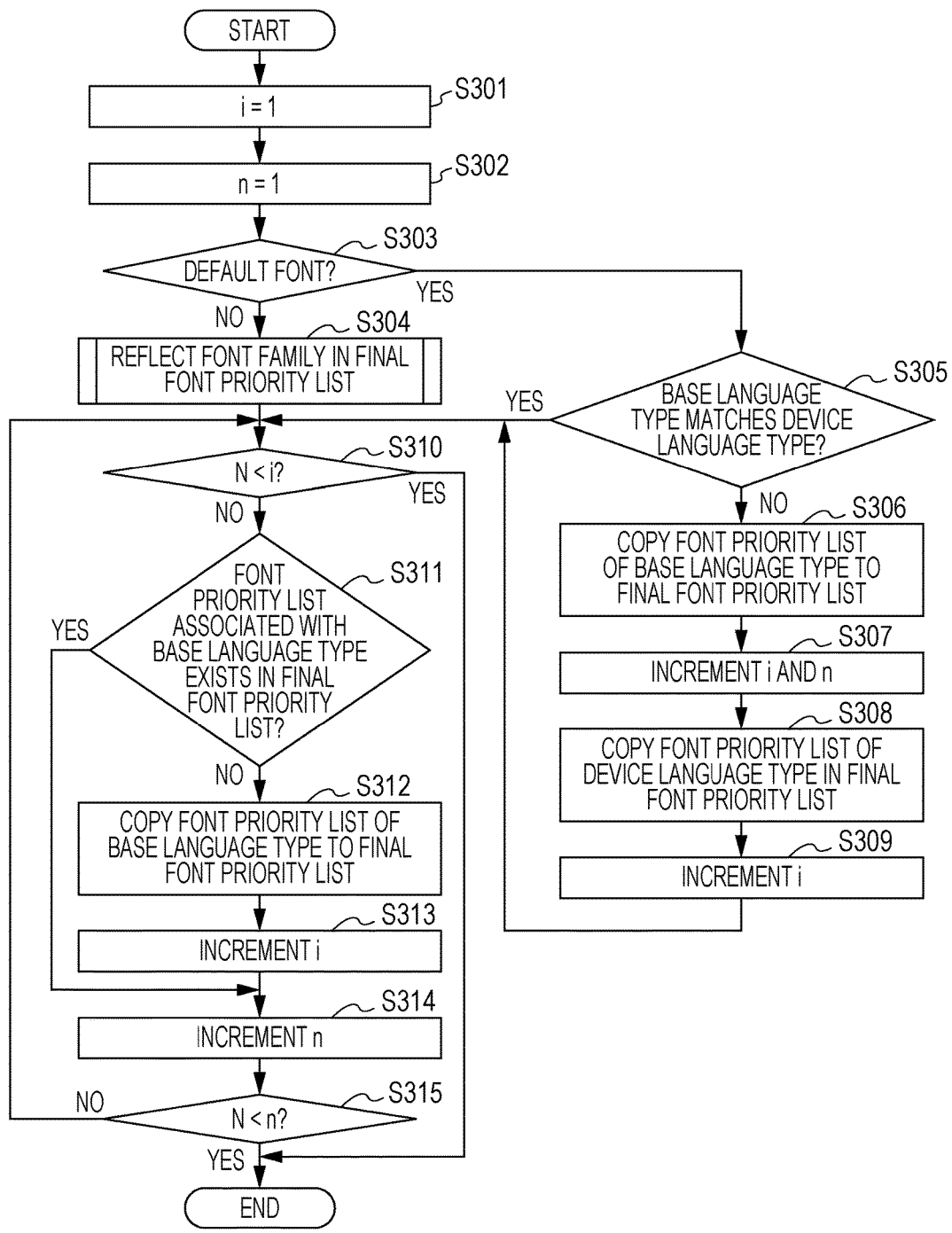
FIG. 6 is a flowchart illustrating a final font priority list sorting process.

FIG. 6 is a flowchart illustrating the process of sorting the font data in the final font priority list in step S211 of FIG. 5.

The font priority list controller 706 initializes a counter value i used to generate the final font priority list to "1" (S301). Furthermore, the font priority list controller 706 initializes a counter value n used to sequentially refer to font data of a default font priority list associated with the base language type of a copy source (S302).

The font priority list controller 706 determines whether a first font family included in the instruction for rendering a character string corresponds to a default display language (hereinafter referred to as a "default font") set in the information processing apparatus 101 (S303). The font priority list controller 706 performs the determination in accordance with a result of a determination as to whether the first font family included in the instruction for rendering a character string is the same as first font data included in the default font priority list. When the determination is negative (No in step S303), the font priority list controller 706 reflects the font family instructed by the application unit 401 in the final font priority list (S304).

When the determination is affirmative (Yes in step S303), the font priority list controller 706 determines whether the base language type matches the device language type (S305). When the determination is negative (No in step S305), the font priority list controller 706 copies n-th font data (n=1) of the default font priority list associated with the base language type to i-th font data (i=1) of the final font priority list (S306). After the copy, the font priority list controller 706 increments the counter values i and n by 1 (S307).

The font priority list controller 706 copies the first font data of the default font priority list associated with the base language type to the i-th font data (i=2) of the final font priority list (S308). After the copy, the font priority list controller 706 increments the counter value i by 1 (S309).

The font priority list controller 706 determines whether the counter value i used to generate the final font priority list exceeds the number N of font data of the final font priority list (S310). When the determination is affirmative (Yes in step S310), the font priority list controller 706 terminates the process of sorting the font data in the font priority list. When the determination is negative (No in step S310), the font priority list controller 706 determines whether the n-th item in the default font priority list associated with the base language type is included in the final font priority list (S311). When the determination is affirmative (Yes in step S311), the font priority list controller 706 increments the counter value n by 1 (S314). When the determination is negative (No in step S311), the font priority list controller 706 copies the n-th font data of the default font priority list associated with the base language type to the i-th font data of the final font priority list (S312). Furthermore, the font priority list controller 706 increments the counter values i and n by 1 (S313 and S314).

The font priority list controller 706 determines whether the counter value n exceeds the number N (S315). When the determination is negative (No in step S315), the font priority list controller 706 determines whether the counter value i used to generate the final font priority list exceeds the number N of font data in the final font priority lists again (S310). When the determination is affirmative (Yes in step S315), the font priority list controller 706 terminates the process of sorting the font data in the font priority list. The font priority list controller 706 repeatedly performs the process from step S310 to step S315 until the counter value n exceeds the number N.

FIG. 7 is a flowchart illustrating the process of reflecting the font family in the final font priority list performed in step S304 of FIG. 6.

The font priority list controller 706 obtains the number K of font families included in the instruction for rendering a character string issued by the application unit 401 (S401). The font priority list controller 706 initializes a counter value k used to refer to the font families included in the instruction for rendering a character string to "1" (S402).

The font priority list controller 706 determines whether the counter value i used to generate the final font priority list exceeds the number N of the font data of the final font priority list (S403). When the determination is affirmative (Yes in step S403), the font priority list controller 706 terminates the process of reflecting the font family in the final font priority list.

When the determination is negative (No in step S403), the font priority list controller 706 determines whether a k-th font family is the default font (S404). When the determination is affirmative (Yes in step S404), the font priority list controller 706 increments the counter value k by 1 (S408). When the determination is negative (No in step S404), the font priority list controller 706 determines whether the k-th font family is already included in the final font priority list (S405). When the determination is affirmative (Yes in step S405), the font priority list controller 706 increments the counter value k by 1 (S408).

When the determination is negative (No in step S405), the font priority list controller 706 copies font data of the k-th font family instructed by the application unit 401 to the i-th font data of the final font priority list (S406). Thereafter, the font priority list controller 706 increments the counter values i and k by 1 (S407 and S408).

The font priority list controller 706 determines whether the counter value k exceeds the number K of font families (S409). When the determination is negative (No in step S409), the font priority list controller 706 determines whether the counter value i of the final font priority list exceeds the number N of the font data of the font priority lists again (S403). When the determination is affirmative (Yes in step S409), the font priority list controller 706 terminates the process of reflecting the font family in the final font priority list. The font priority list controller 706 repeatedly performs the process from step S403 onwards until the counter value k exceeds the number K of font families.

FIG. 8 is a table of final font priority lists having different priority orders which are sorted in a case where the user display language is English, the device display language is Korean, the language type instructed by the application unit 401 is Unicode, and the font family is the default font.

The default font priority lists obtained before the process of FIG. 5 is executed are represented by the font priority list table 1001 of FIG. 3, and are held in the font priority list holding unit 707. By executing the process of FIG. 5, font data in the font priority list table 1001 are sorted as illustrated by a font priority list table 1101 of FIG. 8. In the font priority list table 1101, the second preferential font in a "Latin font priority list" in font priority lists 1102 is changed to a "Korean font" and priority levels of the third preferential font onwards are shifted backward after the process is performed. Furthermore, in accordance with the determination performed in step S311 of FIG. 6, the same language font is not added to the font priority list in an overlapping manner.

Figure 9A:
FIGS. 9A and 9B are diagrams illustrating document lists.
Figure 9B:

FIGS. 9A and 9B are diagrams illustrating lists of documents displayed in the display 119 of the information processing apparatus 101. It is assumed that the user display language is English and the device display language is Korean. A document list 1201 is displayed using the default font priority list of FIG. 3 obtained before the priority order is changed, and kanji characters are displayed using font data of Japanese. A document list 1202 is displayed using the final font priority list of FIG. 8 obtained after the priority order is changed, and kanji characters are displayed using font data of Korean. According to the document lists 1201 and 1202, character shapes of kanji characters are different from each other.

As described above, the user display language is set as a most preferential language, and in addition, a second preferential language is determined in accordance with an environment (a set language) used in the information processing apparatus 101 by the login user. Accordingly, multi-language display suitable for an environment of the user is realized.

Other Operation Forms

Figure 10:
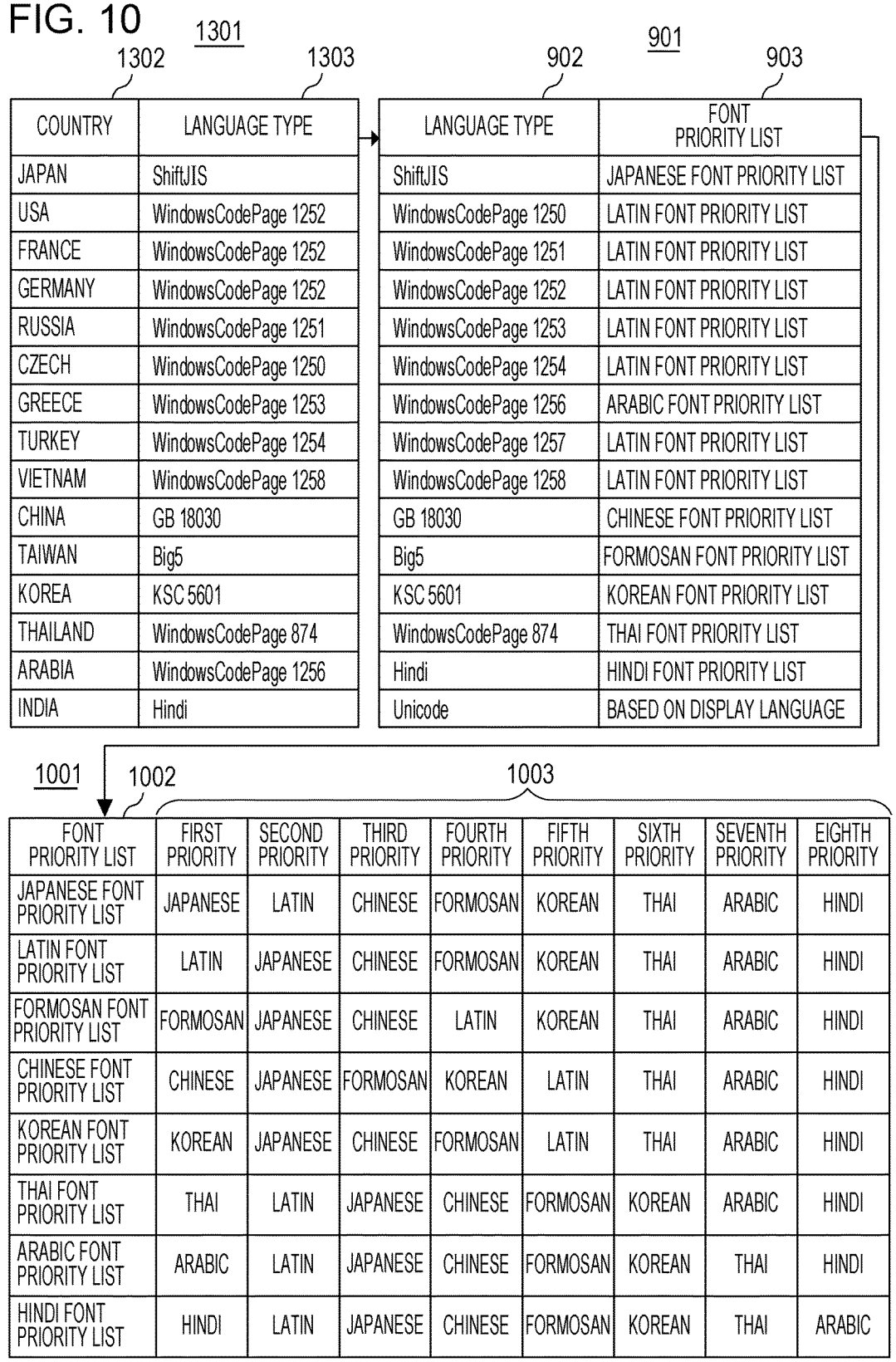
FIG. 10 includes tables of a modification.

FIG. 10 includes tables of a modification. In FIG. 3, the display language table 801 representing the relationships between the display languages 802 and the language types 803 is used. However, in FIG. 10, a country table 1301 representing the relationships between countries 1302 and language types 1303 is used. A language type table 901 and a font priority list table 1001 in FIG. 10 are the same as those of FIG. 3. Since the country table 1301 is used, font priority lists may be generated using country information 603 (refer to FIG. 2). The countries 1302 represent countries where the information processing apparatus 101 is installed.

Figure 11:
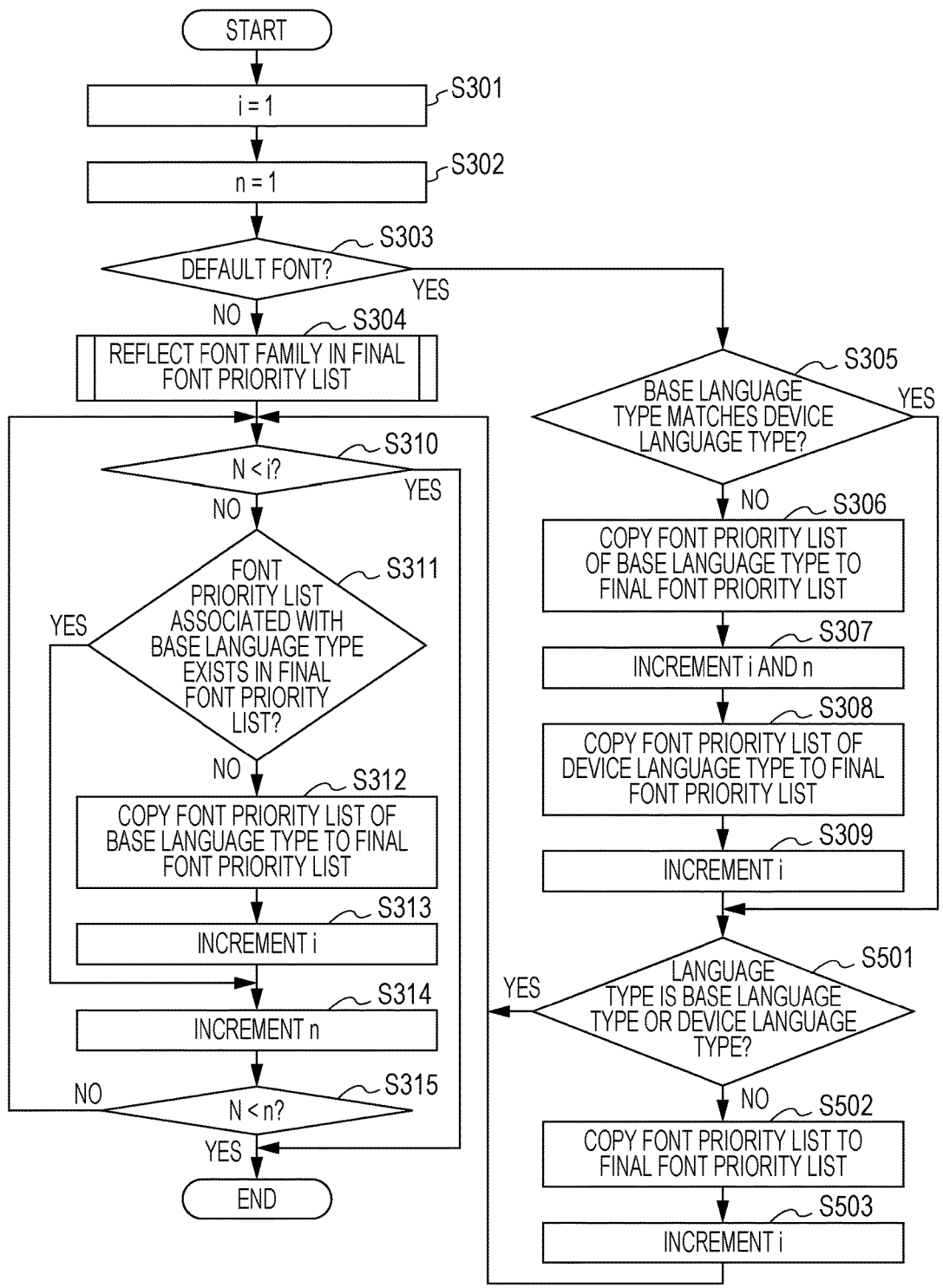
FIG. 11 is a flowchart illustrating a final font priority list sorting process.

FIG. 11 is a modification of the flowchart illustrating the final font priority list sorting process of FIG. 6. In FIG. 11, operations are inserted between step S309 and step S310 of FIG. 6. Other operations of FIG. 11 are the same as those of FIG. 6, and therefore, descriptions thereof are omitted. In the process of FIG. 11, the country table 1301 illustrated in FIG. 10 is used instead of the display language table 801 of FIG. 3, and the countries 1302 are used instead of the display languages 802.

The font priority list controller 706 determines whether a language type 803 associated with a country code represented by a country 1302 matches a base language type or a device language type (S501). When the determination is affirmative (Yes in step S501), the font priority list controller 706 executes the process from step S310 onwards. When the determination is negative (No in step S501), the font priority list controller 706 copies first font data of a default font priority list associated with the country code to i-th font data (a counter value i=3) of the final font priority list (S502). The font priority list controller 706 increments the counter value i (S503) and executes the process from step S310 onwards.

According to the process described above, a following priority order for displaying a font is obtained: a font of a user display language, a font of a device display language, and a font of a display language associated with a country code set in the information processing apparatus 101. Therefore, multi-language display more suitable for an environment of a user may be realized.

As described above, according to the foregoing embodiments, a language of an authenticated user is set as a most preferential language and a language set in an information processing apparatus by default is set as a second most preferential language, and accordingly, character display which is optimum for an environment of the user may be realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-200869, filed Sep. 30, 2014, which is hereby incorporated by reference herein in its entirety.

What is claimed is:

1. An information processing apparatus comprising:
at least a processor and at least a memory coupled to the at least the processor and having stored thereon instructions, when executed by the at least the processor, and cooperating to act as:
a receiving unit configured to receive user identification information;
a display unit configured to display characters;
a user language holding unit configured to hold a list of display languages associated with each of plural pieces of user identification information;
a device language holding unit configured to hold language information about a display language used in a region where the information processing apparatus is installed; and
a font priority list control unit configured to generate a font priority list that is a new list indicating priority orders of languages to be displayed on the information processing apparatus on a basis of the list of display languages held by the user language holding unit and the language information held by the device language holding unit in response to user's logging in to the information processing apparatus,
wherein the font priority list is generated such that, by shifting priority orders of display languages of second highest and subsequent priorities in the list held by the user language holding unit, a priority order of the display language held by the device language holding unit has the second highest priority in the list, and
wherein, in the font priority list, the display language held by the device language holding unit, which has the second highest priority in the font priority list, does not overlap with the other languages in the font priority list.

2. The information processing apparatus according to claim 1, further comprising:
a font priority list holding unit configured to hold a plurality of default font priority lists which have different priority orders of font data of individual languages,
wherein the font priority list control unit obtains one of the default font priority lists in which font data of the display language which is associated with the received user identification information and which is held in the user language holding unit is set as most preferential font data from the font priority list holding unit and performs sorting of a priority order of the languages of the second highest and subsequent order of priority in the obtained default font priority list so as to set the font priority list.

3. The information processing apparatus according to claim 2,
wherein the font priority list control unit sorts the priority order of the languages of the second highest and subsequent order of priority in the obtained default font priority list by increments of one.

4. The information processing apparatus according to claim 2,
wherein the font priority list control unit does not perform the sorting of the priority order of the languages of the second highest and subsequent order of priority in the default font priority list when the display language which is associated with the received user identification information and which is held by the user language holding unit matches with the display language which is held in the device language holding unit.

5. The information processing apparatus according to claim 1, further comprising:
a cache unit configured to store the font priority list set by the font priority list control unit along with the language information as the most preferential language and the language information as the second most preferential language,
wherein the font priority list control unit sets, after the font priority list is stored in the cache unit, the font priority list stored in the cache unit as a font priority list to be used for rendering the characters when a display language obtained when a next font priority list is set matches the display language stored in the cache unit.

6. The information processing apparatus according to claim 1, further comprising:
- a message data storage unit configured to store message data of individual languages;
- an obtaining unit configured to obtain message data of the display language which is associated with the received user identification information and which is stored in the user language holding unit from the message data storage unit; and
- a display control unit configured to display a message based on the message data obtained by the obtaining unit.

7. The information processing apparatus according to claim 1, further comprising:
- an authentication unit configured to perform user authentication in accordance with the user identification information and a password received by the receiving unit,
- wherein the font priority list control unit sets the font priority list when the authentication is successfully performed by the authentication unit.

8. The information processing apparatus according to claim 1,
- wherein the font priority list control unit sets the font priority list such that a language of a country where the information processing apparatus is installed is used as a second preferential language which is preferentially used after the display language stored in the device language holding unit.

9. A display method executed by an information processing apparatus including a receiving unit configured to receive user identification information, a display unit configured to display characters, a user language holding unit configured to hold a list of display languages associated with each of plural pieces of user identification information, a device language holding unit configured to hold language information about a display language used in a region where the information processing apparatus is installed, the method comprising:
- generating a font priority list that is a new list indicating priority orders of languages to be displayed on the information processing apparatus on a basis of the list of display languages held by the user language holding unit and the language information held by the device language holding unit in response to user's logging in to the information processing apparatus,
- wherein the font priority list is generated such that, by shifting priority orders of display languages of second highest and subsequent priorities in the list held by the user language holding unit, a priority order of the display language held by the device language holding unit has the second highest priority in the list, and
- wherein, in the font priority list, the display language held by the device language holding unit, which has the second highest priority in the font priority list, does not overlap with the other languages in the font priority list.

10. A non-transitory computer-readable storage medium which stores a computer program which causes a computer including a receiving unit configured to receive user identification information, a display unit configured to display characters, a user language holding unit configured to hold a list of display languages associated with each of plural pieces of user identification information, and a device language holding unit configured to hold language information about a display language used in a region where the information processing apparatus is installed to function as:
- a font priority list control unit configured to generate a font priority list that is a new list indicating priority orders of languages to be displayed on the information processing apparatus on a basis of the list of display languages held by the user language holding unit and the language information held by the device language holding unit in response to user's logging in to the information processing apparatus,
- wherein the font priority list is generated such that, by shifting priority orders of display languages of second highest and subsequent priorities in the list held by the user language holding unit, a priority order of the display language held by the device language holding unit has the second highest priority in the list, and
- wherein, in the font priority list, the display language held by the device language holding unit, which has the second highest priority in the font priority list, does not overlap with the other languages in the font priority list.

* * * * *